United States Patent

Kono et al.

[15] 3,663,370

[45] May 16, 1972

[54] PROCESS FOR PRODUCING L-GLUTAMIC ACID BY FERMENTATION

[72] Inventors: Kageaki Kono, Tokyo; Toshikazu Oki, Fujisawa-shi; Atsuo Kitai, Kamakura-shi; Asaichiro Ozaki, Tokyo, all of Japan

[73] Assignees: Ajinomoto Co., Inc.; Sanraku Ocean Co. Ltd., Tokyo, Japan

[22] Filed: Mar. 26, 1969

[21] Appl. No.: 810,785

[30] Foreign Application Priority Data

Mar. 30, 1968 Japan...................................43/20617

[52] U.S. Cl..............................................195/49, 195/100
[51] Int. Cl. .......................................................C12d 13/06
[58] Field of Search ......................................195/49, 29, 47

[56] References Cited

UNITED STATES PATENTS

| | | | |
|---|---|---|---|
| 3,222,258 | 12/1965 | Iizuka et al. | 195/29 |
| 3,563,857 | 2/1971 | Oki et al. | 195/49 |

OTHER PUBLICATIONS

Hayashi, O., Oxygenases pages 245– 246 Academic Press, N.Y., N.Y. 1962

*Primary Examiner*—Alvin E. Tanenholtz
*Attorney*—Kurt Kelman

[57] ABSTRACT

L-Glutamic acid is produced by fermentation of culture media containing methanol as the main or sole carbon source by certain strains of microorganisms of the genera Methanomonas, Protaminobacter, and Microcyclus. The glutamic acid yield is improved by the presence of thiamine in the medium, and thiamine is required for growth of some of the microorganisms.

7 Claims, No Drawings

PROCESS FOR PRODUCING L-GLUTAMIC ACID BY FERMENTATION

This invention relates to the production of L-glutamic acid by microbial fermentation of a medium containing methanol as the principal carbon source, organic or inorganic nitrogen sources, inorganic salts, and various minor nutrients necessary for growth of the microorganisms.

It is known to produce L-glutamic acid by fermentation, but said acid was not produced heretofore from methanol. which is available at low cost on a large scale and does not cause the fermentation and engineering problems encountered when petroleum materials such as normal paraffine are employed as carbon sources.

The strains to be employed in this invention were selected from dozens of microorganisms isolated from soil, sewage, compost, humus, oils and petroleum sources by their ability of producing L-glutamic acid when cultured with shaking at 30° C for 40 hours in an aqueous medium having the following composition:

| | |
|---|---|
| Methanol | 2.0% |
| $NH_2PO_4$ | 0.2% |
| $K_2HPO_4$ | 0.7% |
| $(NH_4)_2SO_4$ | 0.3% |
| $MgSO_4 \cdot 7H_2O$ | 0.05% |
| Yeast extract | 0.01% |
| Biotin | 1.0 $\mu$g/l |
| Thiamine-HCl | 100 $\mu$g/l |
| $Fe^{++}$ | 2 ppm |
| $Mn^{++}$ | 2 ppm |
| pH | 6.0–8.0 |

The selected strains include both thiamine-requiring and non thiamine-requiring bacteria.

Their mycological characteristics will now be described in detail.

STRAIN NO. M16–8 (ATCC 21369)

A. Morphological observations (Salts-methanol (1 percent methanol) agar slant, 20–24 hr)

Vegetative cells: straight rods, 0.4–0.7 × 1.0–4.0 microns, occuring singly or in pairs. Elongated cells occasionally observed. Motile by single polar flagellum. No spore formation. Gram negative.

B. Cultural characteristics

1. Salts-methanol (1 percent methanol) agar stroke: (2–3 days)

Moderate growth, filiform, smooth, glistening, milkwhite, opalescent, butyrous to mucoid. Medium unchanged.

2. Salts-methanol (1 percent methanol) agar colonies: (2–4 days)

Punctiform to circular (after 2–3 days), convex, entire, smooth, glistening, non-chromogenic or milk-white, translucent or opalescent.

3. Modified Heinemann's N-free methanol agar: No growth

4. One percent methanol-added nutrient gelatin stab: (20° C, 1 mo)

Growth on surface and along the upper and middle portions of stab, but no growth or scanty growth at the bottom portion. Filiform, no liquefaction.

5. One percent methanol-added Frazier gelatin agar medium:

Growth after 7 days, but no liquefaction

6. Salts-methanol (1 percent methanol) broth: (1–4 days)

Abundant growth, ring or pellicle after 2–3 days, turbid. Sediment exists.

7. This strain cannot grow on ordinary bacteriological media, but does grow if 1–2 percent methanol is added.

C. Physiological characters

1. Relation to free oxygen: facultatively anaerobic
2. Temperature: optimum growth temperature, 20° to 28° C; growth at 10° C; and no growth at 37° C
3. pH for growth: optimum pH, 6.5 to 7.5; pH limits for growth, 5.2 to 9.2
4. Catalase: positive
5. Oxidase: positive
6. Litmus milk: No reaction
7. Starch hydrolysis: negative
8. Gelatin hydrolysis: negative
9. Tween-80 hydrolysis: negative
10. Nitrate reduction: positive, but no gas
11. Indol production: none
12. Urease: positive
13. Koser citrate medium: no growth
14. Halotolerance: usually growth on medium containing 2% NaCl; but sometimes growth on medium containing 1% NaCl, and not 2% NaCl.
15. Inhibition by Terramycin (10 $\mu$g/ml): none
16. Acid production from glucose (Hugh and Leifson method): no growth
17. Utilization of hydrocarbons, carbohydrates, sugars, alcohols, amino acids, organic acids and the like:

After 7–10 days, growth on mineral salts liquid medium with 1 percent methanol as sole carbon source, but no growth with other carbon sources.

(Refer to Table 1)

18. Alkylamine media (monoethylamine and dimethylamine): No growth
19. Incapable of photosynthesis D. Source: Soil, sewage and mud E. GC (guanine + cytosine) contents of DNA: 51.9 mole per cent (by Tm method)

With reference to *Bergey's Manual of Determinative Bacteriology*, 7th edition (1957), the strain M16–8 might be classified into genus Pseudomonas from its general characteristics. However, the GC content of the DNA falls outside the range of 57 to 70, required for this genus. Strain M16-8 should be more suitably classified into genus Methanomonas.

Since strain M16-8 assimilates only methanol, it is differentiated from *Methanomonas methanica* (or *Pseudomonas methanica*) or from *Methanomonas methanooxidans*, and from many others which also assimilate other carbon sources, e.g., sugars, alcohols, organic acids, hydrocarbons, alkylamines and so on.

Therefore, we propose to classify the strain M16-8 into genus Methanomonas as a new species, *Methanomonas methylovora*.

A variety of this species, is light yellow on salts-methanol agar or on synthetic-methanol agar; and yellow on nutrient-methanol agar.

STRAIN NO. M8–5 (ATCC 21370)

A. Morphological observations (Synthetic-methanol (1 percent methanol) agar slant, 24–48 hr)

Vegetative cells: straight rods, 0.4–0.7 × 1.5–3.0 microns, occurring singly or in pairs. Ocassionally elongated or filamentous cells observed. Motile by single polar flagellum. No spore formation. Gram negative.

B. Cultural characteristics

1. Salts-methanol (1 percent methanol) agar stroke: (2–3 days)

Scanty growth, beaded, smooth, glistening, non-chromogenic, translucent. Medium unchanged.

Abundant growth with thiamine-HCl (200–1,000 $\mu$g/l) added, and characteristics identical with M16-8, i.e. *Methanomonas methylovora*.

2. Synthetic-methanol (1 percent methanol) agar stroke: (2–3 days)

Moderate growth, filiform, smooth, glistening, milk-white (occasionally slightly pink), opalescent, butyrous to mucoid. Medium unchanged.

3. Synthetic-methanol (1 percent methanol) agar colonies: (2–4 days)

Punctiform to circular (after 2–3 days), convex, entire, smooth, glistening, milk-white, opalescent.

4. Synthetic-methanol (1 percent methanol) agar stab: (2–7 days)

Growth on surface and along stab, filiform.

5. One percent methanol-added Frazier gelatin agar medium: (7 days)

Good growth, but no liquefaction

6. Modified Heinemann's N-free methanol agar: No growth

7. Synthetic-methanol (1 percent methanol) broth: (1–4 days)

Abundant growth, ring or pellicle, turbid. Sediment exists.

8. This strain cannot grow on ordinary bacteriological media, but does grow if 1–2 percent methanol is added.

C. Physiological characters

1. Relation to free oxygen: facultatively anaerobic
2. Temperature: optimum temperature for growth, 20° to 28° C; no growth at 10° C; no growth at 45° C
3. pH for growth: optimum pH, 6.5 to 7.5; pH limits for growth, 5.2 to 9.2
4. Catalase: positive
5. Oxidase: positive
6. Litmus milk: no reaction
7. Starch hydrolysis: negative
8. Gelatin hydrolysis: negative
9. Tween-80 hydrolysis: negative
10. Nitrate reduction: positive, but no gas
11. Indol production: none
12. Urease: positive
13. Koser citrate medium: no growth
14. Halotolerance: growth on medium containing 2% NaCl.
15. Inhibition by Terramycin (10μg/ml): none
16. Acid production from glucose (Hugh and Leifson method): no growth
17. Utilization of hydrocarbons, carbohydrates, sugars, alcohols, amino acids, organic acids and the like:

After 7–10 days, growth on mineral salts liquid media containing 1 percent methanol as sole carbon source and 500μg/l thiamine-HCl, but no growth with the lack of either. (Refer to Table 1)

18. Alkylamine media (Monoethylamine and dimethylamine): no growth
19. Incapable of photosynthesis D. Source Soil, sewage and mud Since the strain M8–5 exhibits characteristics identical with those of the strain M16–8, when incubated in media containing thiamine-HCl (100 μg/l or more), it was named *Methanomonas methylovora var. thiaminophila*.

STRAIN NO. M135–7 (ATCC 21371)

A. Morphological observations (Synthetic-methanol (1 percent methanol) agar slant, 24–48 hr)

Vegetative cells: rods, 0.3–0.7 × 1.5–4.5 microns, occurring singly or in pairs. Occasionally elongated or filamentous cells observed. Motile by single polar flagellum. No spore formation. Gram negative.

B. Cultural characteristics

1. Synthetic-methanol (1 percent methanol) agar stroke: (1–3 days)

Moderate growth, filiform, smooth, glistening, milk-white, opalescent. Medium unchanged.

2. Salts-methanol (1 percent methanol) agar stroke: (over 7 days)

No or scanty growth.

Moderate growth with thiamine-HCl (500μg/l) or yeast extract (0.01 to 0.1 percent) added.

3. Synthetic-methanol (1 percent methanol) agar colonies: (1–3 days)

Punctiform to circular (after 2–3 days), convex, entire, smooth, glistening, milk-white, opalescent.

4. Synthetic-methanol (1 percent methanol) agar stab: (1–7 days)

Growth on surface and along stab, filiform.

5. Synthetic-methanol (1 percent methanol) broth: (1–4 days)

Abundant growth, ring or pellicle, turbid. Sediment exists.

6. One percent methanol-added Frazier gelatin agar medium: (7 days)

Good growth, but no liquefaction

7. Modified Heinemann's N-free methanol agar: No growth

8. This strain cannot grow on ordinary bacteriological media, but does grow if 1–2 percent methanol is added.

C. Physiological characters

1. Relation to free oxygen: facultatively anaerobic
2. Temperature: optimum for growth, 20° to 30° C, no growth at 10° C and at 45° C.
3. pH for growth: optimum for growth, 7.0 to 8.0; pH limits for growth, 5.2 to 9.5
4. Catalase: positive
5. Oxidase: positive
6. Litmus milk: no reaction
7. Starch hydrolysis: negative
8. Gelatin hydrolysis: negative
9. Tween-80 hydrolysis: negative
10. Nitrate reduction: negative
11. Indol production: none
12. Urease: positive
13. Koser citrate medium: no growth
14. Halotolerance: growth on medium containing 2% NaCl.
15. Inhibition by Terramycin (10 μg/ml): none
16. Acid production from glucose (Hugh and Leifson method): no growth
17. Utilization of hydrocarbons, carbohydrates, sugars, alcohols, amino acids, organic acids and the like:

After 7–10 days, growth on mineral salts liquid medium with 1 percent methanol as sole carbon source and 500μg/l thiamine-HCl; but no growth with other carbon sources and with the lack of either methanol or thiamine-HCl. (Refer to Table 1.)

18. Alkylamine media (monoethylamine and dimethylamine): growth after 7 days only with thiamine-HCl (500μg/l) added.

D. Source

Soil, sewage and mud

With the above-described properties, the strain M135–7 may be properly classified into genus Protaminobacter in accordance with Bergey's manual.

The motile strain M135-7 is achromogenic and assimilates only methanol. Such characteristics differentiate it from *Protaminobacter ruber* and from other known species of genus Protaminobacter.

We would propose to name the new species *Protaminobacter thiaminophagus*. We have also found a variety of this species, which shows negative urease activity.

STRAIN NO. M89–3A (ATCC 21372)

A. Morphological observations (Salts-methanol (1 percent methanol) agar slant, 20–24 hr)

Vegetative cells: straight or slightly curved rods, usually 0.4–0.7 × 1.0–2.5, occurring singly or in pairs.

Pleomorphic: elongated cells and swollen cells (1.0–1.5 × 2.5–5.0 microns) in irregular shape observed. Nonmotile. No spore formation. Gram negative.

B. Cultural characteristics

1. Salts-methanol (1 percent methanol) agar stroke: (2–3 days)

Abundant growth, filiform to spreading, smooth, glistening, white, opaque to opalescent, butyrous. Medium occasionally brown after 10 days.

2. Salts-methanol (1 percent methanol) agar colonies: (1–3 days)

Circular or irregular, convex or raised, undulate or entire, smooth, glistening, milk-white or grayish white, opaque, butyrous.

3. Synthetic-methanol (1 percent methanol) agar stab: (1–5 days) Growth on surface and along stab.

4. Salts-methanol (1 percent methanol) broth: (1–4 days)

Moderate growth, ring or occasionally pellicle, turbid. Sediment exists.

5. One percent methanol-added Frazier gelatin agar medium: (7 days)
   Growth, but no liquefaction
6. Modified Heinemann's N-free methanol agar: No growth
7. This strain cannot grow on ordinary bacteriological media, but does grow if 1–2 percent methanol is added.

C. Physiological characters
   1. Relation to free oxygen: facultatively anaerobic
   2. Temperature: optimum growth temperature, 20° to 28° C; no growth at 10° C and at 40° C.
   3. pH for growth: optimum pH, 6.5 to 7.5; pH limits for growth, 5.2 to 8.5
   4. Catalase: positive
   5. Oxidase: positive
   6. Litmus milk: no reaction
   7. Starch hydrolysis: negative
   8. Gelatin hydrolysis: negative
   9. Tween-80 hydrolysis: negative
   10. Nitrate reduction: positive, but no gas
   11. Indol production: negative
   12. Urease: positive
   13. Koser citrate medium: no growth
   14. Halotolerance: growth on medium containing 2% NaCl.
   15. Inhibition by Terramycin (10 μg/ml): none
   16. Acid production from glucose (Hugh and Leifson method): no growth
   17. Utilization of hydrocarbons, carbohydrates, sugars, alcohols, amino acids, organic acids and the like:
       After 7–10 days, growth on mineral salts liquid medium with 1 percent methanol as sole carbon source, but no growth with other carbon sources.
       (Refer to Table 1.)
   18. Alkylamine media (monoethylamine and dimethylamine):
       After 2–7 days, growth on dimethylamine agar medium, but no growth on monoethylamine agar medium.
       Chromogenesis, white or milk white.
   19. Amide agar medium (formamide or acetoamide): No growth D. Source
   Soil, sewage and mud The strain M89-3A can be fitted into genus Protaminobacter. but is distinguished from the only non-motile species, P. alboflavus which grows on ordinary biological media assimilating organic acids, amino compounds, amines and ethyl alcohol. We therefore consider the strain M89-3A a new species Protaminobacter candidus. We have found two varieties of this species, of which Variety A shows negative nitrate reduction and positive urease activity; and Variety B, positive nitrate reduction and negative urease. The varieties of the species are more rough and dull in appearance on salts-methanol or synthetic-methanol agar media.

STRAIN NO. M224–3 (ATCC 21373)

A. Morphological observations
   (Nutrient agar slant, 20–24, hr)
   Vegetative cells: slightly curved rods, 0.5–1.0 × 1.7–3.0 microns, which form a closed ring during growth.
   The rings grow into bodies which subdivide again into rod-shaped elements as at the beginning. Occasionally, during growth, the rods form spiral-shape by chain.
   Occasionally, cells with swollen rounded end seen.
   Non-motile, no spore formation. Gram negative.

B. Cultural characteristics
   1. Nutrient agar stroke: (1–2 days)
   Moderate growth, filiform, rough or slightly wrinkled, dull, white to ivory, viscoid. Medium unchanged.
   2. Nutrient-methanol (1 percent methanol) agar stroke: (1–2 days)
   Growth and characteristics identical with 1.
   Occasionally in old culture, color is light yellowish white to pale yellowish brown.
   3. Salts-methanol agar stroke: (over 10 days)
   No or scanty growth
   4. Synthetic-methanol agar stroke:
   Late growth: after 2–3 days, moderate growth, beaded to filiform (3–5 days), rough to smooth, white or ivory, opaque, butyrous. Medium unchanged.
   5. Nutrient agar colonies: (1–2 days)
   Circular, convex, entire, smooth, dull, opaque
   6. Synthetic-methanol agar colonies: (3–5 days)
   Punctiform to circular. Others similar to 5.
   7. Nutrient broth: (1–3 days)
   Little or moderate growth, no pellicle, granular. Sediment scanty, flocculent.
   8. Milk agar medium: (2–5 days)
   Growth, white, no liquefaction.
   9. Potato plug: (3–5 days)
   Late growth, filiform, dull, white. Medium unchanged.
   10. Nutrient gelatin stab: (at 20° C, 1 mo)
   Growth on surface and along stab, filiform.
   No liquefaction.

C. Physiological characters
   1. Relation to free oxygen: facultatively anaerobic
   2. Temperature: optimum growth temperature, 20°–28° C; growth at 10° C; but no growth at 45° C.
   3. pH for growth: optimum pH, 7.0 to 7.5; pH limits for growth, 5.5 to 9.2
   4. Catalase: positive
   5. Litmus milk: no reaction in 25 days and thereafter slightly alkali
   6. Starch hydrolysis: negative
   7. Gelatin hydrolysis: negative
   8. Tween-80 hydrolysis: negative
   9. Nitrate reduction: negative
   10. Indol production: negative
   11. Hydrogen sulfide production: negative
   12. Acetylmethylcarbinol production: negative
   13. Methyl red: negative
   14. Urease: positive
   15. Koser citrate medium: Growth
   16. Halotolerance: growth on medium with 1% NaCl; but no growth with 2% NaCl.
   17. Inhibition by Terramycin (10 μg/ml): uncertain
   18. Acid production from carbohydrates (Hugh and Leifson method):
       Acid, but no gas, produced oxidatively and fermentatively from the following carbohydrates: arabinose, galactose, xylose, glucose and mannitol.
       Neither acid nor gas produced oxidatively from the following carbohydrates: sucrose, starch and glycerol.
   19. Utilization of hydrocarbons, carbohydrates, sugars, alcohols, amino acids, organic acids and the like: (7–10 days)
       Growth on mineral salts plus thiamine-HCl (500 μg/l) liquid media containing glucose, xylose, mannitol, glycerol, methanol, ethanol, acetaldehyde, acetate, pyruvate, lactate, malate, fumarate, succinate, L-alanine, and L-glutamic acid.
       Slight growth on same media containing lactose, citrate, DL-aspartic acid.
       No growth on other substrates. (Refer to Table 1.)
   20. Alkylamine media (monoethylamine and dimethylamine): (over 7 days)
       No growth, even with the addition of thiamine-HCl (500 μg/l) into media.

D. Source
   Sewage

With the above described properties, the strain M224-3 may be properly classified into genus Microcyclus in which Bergey's manual describes only the species, i.e., Microcyclus aquaticus.

The strain M224-3 can grow on mineral salts medium containing 1 percent methanol, only when yeast extract (0.01 percent or more) or thiamine-HCl (50 μg/l or more) is added to the medium; and in about 3 days, the strain produces acid from glucose. In this aspect, M224-3 is distinguished from M. aquaticus and is considered a new species Microcyclus eburneus.

The media used are outlined as follows:

Synthetic-methanol medium: The basal medium has the same composition as the medium used for the selection of the strains.

Modified Heinemann's nitrogen-free methanol agar medium: Heinamann's nitrogen-free glucose agar medium in which glucose is replaced by 1 percent methanol.

Salts-methanol medium: 1 percent methanol added to Dworkin and Foster medium.* (* M. Dworkin and J.W. Foster, *J. Bacteriol*, 72, 646–659(1956))

Amide agar medium: Peter Hirschi and Conti medium* (* Peter Hirschi and S.F. Conti, *Archiv fuer Mikrobiologie*, 48, 358–367 (1964))

Alkylamine agar medium: den Dooren de Jong medium* (*den Dooren de Jong, Zentr. Bakteriol. Parasitenk., Abt. II, 71, 218 (1927))

For other tests, conventional medium with 1 percent methanol added is used.

Cultivation is carried out at 28° C, unless otherwise noted.

TABLE 1

| Substrate | Growth | | | | |
|---|---|---|---|---|---|
| | ATCC (21369) M16-8 | ATCC (21370) M8-5 | ATCC (21371) M135-7 | ATCC (21372) M89-3A | ATCC (21373) M224-3 |
| Glucose | − | − | − | − | + |
| Fructose | − | − | − | − | − |
| Sucrose | − | − | − | − | − |
| Lactose | − | − | − | − | − |
| Xylose | − | − | − | − | + |
| Mannitol | − | − | − | − | + |
| Glycerol | − | − | − | − | + |
| Methane | − | − | − | − | − |
| Ethane | − | − | − | − | − |
| n-Propane | − | − | − | − | − |
| Butane | − | − | − | − | − |
| Methanol | + | + | + | + | + |
| Ethanol | − | − | − | − | + |
| n-Propanol | − | − | − | − | − |
| Formaldehyde | − | − | − | − | − |
| Acetaldehyde | − | − | − | − | ± |
| Acetone | − | − | − | − | − |
| Phenol | − | − | − | − | − |
| Benzene | − | − | − | − | − |
| Naphthalene | − | − | − | − | − |
| Kerosene | − | − | − | − | − |
| Formate | − | − | − | − | − |
| Acetate | − | − | − | − | + |
| Pyruvate | − | − | − | − | + |
| Oxalate | − | − | − | − | − |
| Lactate | − | − | − | − | + |
| Malonate | − | − | − | − | − |
| Propionate | − | − | − | − | − |
| Malate | − | − | − | − | + |
| Fumarate | − | − | − | − | + |
| Succinate | − | − | − | − | + |
| Gluconate | − | − | − | − | − |
| Citrate | − | − | − | − | ± |
| DL-glycine | − | − | − | − | − |
| L-alanine | − | − | − | − | ± |
| L-leucine | − | − | − | − | − |
| DL-isoleucine | − | − | − | − | − |
| L-arginine | − | − | − | − | − |
| DL-methionine | − | − | − | − | − |
| DL-aspartic acid | − | − | − | − | − |
| L-glutamic acid | − | − | − | − | ± |
| DL-tryptophane | − | − | − | − | − |
| Lysine | − | − | − | − | − |
| Alkylamine media used: | | | | | |
| Monomethylamine | − | − | ± | ± | − |
| Monoethylamine | − | − | − | − | − |
| Amide media used: | | | | | |
| Formamide | | | | | − |

Some of the above-named strains require thiamine for growth and others do not. When nonthiamine-requiring strains are used, a small amount of thiamine promotes the metabolism and increases the production of L-glutamic acid. Further to examine the influence of thiamine, an experiment was carried out with the above-described strains cultivated on a basal medium of the following composition:

| Methanol | 2.0% |
|---|---|
| $K_2HPO_4$ | 0.7% |
| $KH_2PO_4$ | 0.2% |
| $MgSO_4 \cdot 7H_2O$ | 0.05% |
| $(NH_4)_2SO_4$ | 0.3% |
| Biotin | 10 μg/l |
| $Mn^{++}$ | 2 ppm |
| $Fe^{++}$ | 2 ppm |

Forty Ml batches of the medium in 500-ml Sakaguchi flasks were sterilized, inoculated, and cultured with shaking at 29° C for 48 hours. 2 percent methanol was fed in three parts during the process according to the amount consumed. The pH was maintained at 7.5 by supplying 25 percent urea solution.

The culture broth was diluted with 20 volumes of water. Then, the growth was measured by optical density at 610 mμ; and the amount of L-glutamic acid accumulated, was determined by microbiological assay with *Lactobacillus arabinosus*. The results are summarized below:

As is evident from the above, an appropriate amount of thiamine is either indispensable or desirable for the production of glutamic acid in a substantial amount. The abilities of the microorganisms to grow and produce said acid with the addition of thiamine vary from one strain to another. They do not grow with too small an amount of thiamine, and an excessive use of it resulted in lowering the yield of the acid.

As the principal carbon source, methanol can be incorporated in the medium only at the beginning of process, but it is better to start at a low concentration of methanol and feed additional amounts during the process according to the consumption.

A wide variety of nitrogen sources to be employed includes ammonium sulfate, ammonium nitrate, ammonium carbonate, ammonium chloride, aqueous ammonia, and urea. Other nitrogen-bearing substances such as amino acids, corn steep liquor, Aji-eki (soybean hydrolysate), bouillon, pepton, yeast extract and other organic nutrient materials produce the usual results, as do the conventional trace elements, vitamins and other secondary nutrients essential for microbial growth in a known manner.

Metal ions such as $Fe^{++}$, $Mn^{++}$, $Zn^{++}$, $Co^{++}$, $Ca^{++}$, $Pb^{++}$ can be supplied with water (stream water, sea water, etc.) containing the same.

Suitable thiamine sources include yeast extract, liver extract, rice-bran extract, and so on.

The pH of the culture medium should be maintained between 5.0 and 9.0, and is held initially between 5.5 and 8.0. The temperature should be between 16° and 37° C (and preferrably 25° to 34° C). But, some strains can grow and produce glutamic acid at a lower temperature.

The fermentation is carried out under aerobic conditions and requires generally 1 to 3 days, and occasionally 2 to 4 days, for best results.

L-glutamic acid as accumulated in the above described

EFFECT OF THIAMINE ADDED ON L-GLUTAMIC ACID PRODUCTION

| Thiamine-HCl, μg./l. | M16-8 *Methanomonas methylovora* | | M8-5 *Methanomonas methylovora var. thiaminophila* | | M135-7 *Protaminobacter thiaminophagus* | | M89-3A *Protaminobacter candidus* | | M224-3 *Mycrocyclus eburneus* | |
|---|---|---|---|---|---|---|---|---|---|---|
| | OD×20 | L-GA, g./dl. | OD×20 | L-GA, g./dl. | OD×20 | L-GA, g./dl. | OD×20 | L-GA, g./dl. | OD×20 | L-GA, g./dl |
| 0 | 0.71 | 0.34 | 0.15 | 0 | 0 | 0 | 0.65 | 0.35 | 0 | 0 |
| 10 | 0.72 | 0.37 | 0.21 | 0.03 | 0.30 | 0.16 | 0.67 | 0.33 | 0.08 | 0.02 |
| 50 | 0.74 | 0.44 | 0.42 | 0.13 | 0.46 | 0.25 | 0.63 | 0.44 | 0.35 | 0.11 |
| 100 | 0.85 | 0.50 | 0.57 | 0.17 | 0.68 | 0.34 | 0.72 | 0.52 | 0.38 | 0.13 |
| 500 | 0.83 | 0.47 | 0.72 | 0.43 | 0.73 | 0.58 | 0.69 | 0.47 | 0.45 | 0.13 |
| 1,000 | 0.80 | 0.48 | 0.90 | 0.55 | 0.83 | 0.67 | 0.71 | 0.48 | 0.50 | 0.12 |
| 2,000 | 0.75 | 0.35 | 0.95 | 0.32 | 0.80 | 0.70 | 0.65 | 0.45 | 0.52 | 0.09 |
| 4,000 | 0.76 | 0.25 | 0.85 | 0.38 | 0.70 | 0.55 | 0.63 | 0.40 | 0.51 | 0.08 |

NOTE.—L-GA = L-glutamic acid. OD = optical density.

medium after fermentation is recovered from the fermented mash by ion-exchange resin treatment, crystallization, or like known methods.

The following Examples are further illustrative of this invention, but it will be understood that the invention is not limited to the Examples.

EXAMPLE 1

Seed culture medium was prepared with the following composition:

| | |
|---|---|
| $K_2HPO_4$ | 0.2% |
| $KH_2PO_4$ | 0.7% |
| $MgSO_4 \cdot 7H_2O$ | 0.05% |
| $(NH_4)_2SO_4$ | 0.3% |
| Biotin | 2 μg/l |
| Thiamine-HCl | 100 μg/l |
| Yeast extract | 0.01% |
| $Fe^{++}$ | 2 ppm |
| $Mn^{++}$ | 2 ppm |

The above was mixed with 2 percent methanol, inoculated with the strains, M16-8, M89-3A and M224-3, respectively, and cultivated with shaking at 27° C for 18 hours.

The seed culture broth thus obtained was transferred (10 percent by volume) to a main culture medium of the same composition (30 ml) in a 500-ml Sakaguchi flask, which was cultivated with shaking at 27° C.

Fifteen percent aqueous ammonium hydroxide was added during fermentation to maintain the pH between 6.0 and 8.5 and to supply a nitrogen source; and methanol was supplied at a rate of 2 percent to balance the consumption. After 48 hours of fermentation, the L-glutamic acid accumulated in the medium is given for the respective strains in Table 2.

TABLE 2

| Strain | Methanol Initial (Vol.%) | Methanol Feed (Vol.%) | L-glutamic acid (g/dl) | Growth of strain (x20)OD |
|---|---|---|---|---|
| M16-8 (ATCC 21369) (Methanomonas methylovora) | 2 | 8 | 1.05 | 0.90 |
| M89-3A (ATCC 21372) (Protaminobacter candidus) | 2 | 8 | 0.26 | 0.73 |
| M224-3 (ATCC 21373) (Microcyclus eburneus) | 2 | 8 | 0.21 | 0.47 |

EXAMPLE 2

Seed culture medium of the same composition as in Example 1 was prepared except that the following vitamines were employed instead of yeast extract:

| | |
|---|---|
| Riboflavin | 1000 μg/l |
| Pyridoxine | 1000 μg/l |
| Calcium-panthotenate | 1000 μg/l |
| Nicotinic acid | 1000 μg/l |
| Aminobenzoic acid | 100 μg/l |
| Folic acid | 50 μg/l |

After 48 hours of fermentation in the same manner as in Example 1, the L-glutamic acid accumulated in the medium is given in Table 3.

TABLE 3

| Strain | Methanol (vol. %) | L-glutamic acid (g/dl) |
|---|---|---|
| M16-8 (ATCC 21369) (Methanomonas methylovora) | 6 | 0.24 |
| M89-3A (ATCC 21372) (Protaminobacter candidus) | 6 | 0.31 |
| M224-3 (ATCC 21373) (Microcyclus eburneus) | 6 | 0.27 |

EXAMPLE 3

Forty milliliters of culture broth sterilized in a 500-ml Sakaguchi flask, had the following composition:

| | |
|---|---|
| $KH_2PO_4$ | 0.2% |
| $K_2HPO_4$ | 0.7% |
| $(NH_4)_2SO_4$ | 0.3% |
| $MgSO_4 \cdot 7H_2O$ | 0.05% |
| Yeast extract | 0.03% |
| $Mn^{++}$ | 2 ppm |
| $Fe^{++}$ | 2 ppm |

Thiamine-HCl as listed in Table 4 was added. The medium was inoculated with strains given in Table 4, held at 28° C, and methanol was added at the rate of 2 percent after 8, 16, 24 and 30 hours. The pH was adjusted with 20 percent urea solution to about 7.5. After 60 hours of cultivation, L-glutamic acid accumulated in the culture broth as listed in Table 4.

TABLE 4

| Strain | Thiamine-HCl contents (μg/l) | L-glutamic acid (g/dl) | Growth of strain (x20)OD at 610 mμ |
|---|---|---|---|
| M8-5 (ATCC 21370) (Methanomonas methylovora var. thiaminophila) | 2,000 | 0.91 | 0.84 |
|  | 0 | 0.02 | 0.20 |
| M135-7 (ATCC 21371) (Protaminobacter thiaminophagus) | 1,000 | 0.86 | 0.92 |
|  | 0 | 0.10 | 0.38 |

What is claimed is:

1. In a method of producing L-glutamic acid by culturing a microorganism under aerobic conditions on a nutrient medium including a source of assimilable carbon, a source of assimilable nitrogen, and minor nutrients, the improvement which consists in said source of carbon being constitued mainly by methanol, and said microorganism being capable of forming L-glutamic acid by metabolizing said methanol as a source of carbon and selected from the group consisting of Methanomonas, Protaminobacter and Microcyclus.

2. In a method as set forth in claim 1, said nutrient medium during said culturing being maintained at a pH between 5 and 9 and at a temperature between 16° and 37° C.

3. In a method as set forth in claim 1, the concentration of said methanol being maintained at an effective level by replenishing said nutrient medium with said methanol during said culturing.

4. In a method as set forth in claim 1, the concentration of nitrogen being maintained by replenishing said nutrient medium with said nitrogen source during said culturing.

5. A method as set forth in claim 1, wherein said medium includes thiamine in an amount effective to increase the yield of said L-glutamic acid.

6. In a method as set forth in claim 1, said microorganism being Methanomonas methylovora (ATCC No. 21369), Methanomonas methylovora var.thiaminophila (ATCC No. 21370), Protaminobacter thiaminophagus (ATCC No. 21371), Protaminobacter candidus (ATCC No. 21372), or Microcyclus eburneus (ATCC No. 21373).

7. In a method as set forth in claim 1, said microorganism being cultured on said medium until L-glutamic acid accumulates in the medium, and recovering the accumulated L-glutamic acid.

* * * * *